(12) United States Patent
Watada et al.

(10) Patent No.: US 6,238,079 B1
(45) Date of Patent: May 29, 2001

(54) KNEADING DEGREE ADJUSTING DEVICE FOR TWIN EXTRUDER

(75) Inventors: Satoru Watada; Katuyuki Naitou, both of Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 0 days.

(21) Appl. No.: 09/560,890

(22) Filed: Apr. 28, 2000

(30) Foreign Application Priority Data

Apr. 28, 1999 (JP) .................................. 11-121059

(51) Int. Cl.[7] ................................ B29B 7/46; B29B 7/58
(52) U.S. Cl. .................. 366/80; 366/84; 366/90
(58) Field of Search .................. 366/79, 80, 83–85, 366/88–90; 425/204, 208, 209

(56) References Cited

U.S. PATENT DOCUMENTS

| | | |
|---|---|---|
| 3,360,824 | 1/1968 | Schippers . |
| 3,419,250 | 12/1968 | Brennan, Jr. . |
| 3,870,285 | 3/1975 | Bausch et al. . |
| 3,981,658 | 9/1976 | Briggs ................................ 425/208 |
| 4,299,499 | 11/1981 | Buchheit . |
| 4,332,481 | 6/1982 | Inoue et al. ........................... 366/84 |
| 4,462,691 | 7/1984 | Boguslawski ........................ 366/80 |
| 4,678,339 | 7/1987 | Peiffer et al. ........................ 366/79 |
| 5,335,991 | 8/1994 | Wobbe . |
| 5,909,958 | 6/1999 | Rauwendaal . |

FOREIGN PATENT DOCUMENTS

| | | | |
|---|---|---|---|
| 513431 | 11/1992 | (EP) | ........................................ 366/85 |
| 2-89606 | 3/1990 | (JP) | ........................................ 366/85 |
| 2-99305 | 4/1990 | (JP) | ........................................ 366/84 |
| 4-14412 | 1/1992 | (JP) | ........................................ 366/80 |
| 4-22606 | 1/1992 | (JP) | ........................................ 366/81 |
| 4-22607 | 1/1992 | (JP) | ........................................ 366/80 |
| 94/15769 | 7/1994 | (WO) . | |

OTHER PUBLICATIONS

Patent Abstracts of Japan, Publication No. 02092516, Apr. 3, 1990, Application No. 63243925, Sep. 30, 1988.

*Primary Examiner*—Charles E. Cooley
(74) *Attorney, Agent, or Firm*—Sughrue, Mion, Zinn, Macpeak & Seas, PLLC

(57) ABSTRACT

A cylinder 2 is formed with an upper guide bore 10a and a lower guide bore 10b at a position corresponding to a gate part B. Gate rods 7 are rotatably inserted through the guide bores 10a, 10b, respectively. Each of the gate rods 7 is formed with opening degree changing recesses in a form of an opencut adjacent to each other in an axial direction in order to constitute opening degree variable channels S in combination with opening degree variable channel forming parts 14 of two screws 3. Each of the recesses 11 consists of a first semicircular face 12 and a second semicircular face 13 in such a shape that an upstream side end of the first semicircular face 12 is diagonally cut. By rotating the gate rods 7 in a positive direction and a reverse direction, the opening degree can be changed between a fully opened state wherein the first semicircular face 12 and the opening degree variable channel forming part 14 are in parallel and a fully closed position wherein the second semicircular face 13 is in abutment against the opening degree variable channel forming part 14.

3 Claims, 6 Drawing Sheets

KNEADING DEGREE ADJUSTING DEVICE FOR TWIN EXTRUDER

BACKGROUND OF INVENTION

1. Field of Invention

The present invention relates to a kneading degree adjusting device for a twin extruder.

2. Related Art

FIGS. 6A–6C show one example of kneading degree adjusting devices in a conventional twin extruder. This kneading degree adjusting device in the twin extruder comprises a cylinder 101 and two screws 102 which are rotatably provided in the cylinder 101. A pair of gate valves 103a, 103b provided at a downstream side of a kneading part B so as to be movable perpendicularly to an axial direction (upward and downward in the drawings) are brought closer to or separated from each other by means of hydraulic cylinders 106a, 106b, whereby gaps formed between faces 102a at the root of a flight of the screws 102 and semicircular faces 104a, 104b formed at the tip ends of the gate valves 103a, 103b are changed in size, thereby to vary the kneading degree (Examined Japanese Utility Model Publication Hei. 7-56185).

In the above described conventional art, due to the structure that a pair of the gate valves are moved perpendicularly to the axial direction in order to change the gaps (hereinafter referred to as "opening degree variable channels") formed between the faces of the screws at the root of the flight and the semicircular faces formed at the tip ends of the gate valves, there have been such problems as described below.

A sectional shape of the opening degree variable channel varies from a substantially annular shape to a substantially oval shape, and the gaps between the semicircular faces of a pair of the gate valves and the faces of the screws at the root of the flight are subjected to a greater change in a vertical direction than in a lateral direction. As the result, an unmolten material having high viscosity is allowed to short-pass the larger gaps in an upper and lower parts, and thus a filling degree of the material in the kneading part upstream of the gate valves will become unstable. Therefore, a uniform kneading efficiency cannot be obtained.

Further, because the opening degree of the opening degree variable channel is changed by moving a pair of the gate valves perpendicularly to the axial direction of the cylinder, not only opening and closing times of the channels will be longer but also the structure will become complicated.

SUMMARY OF INVENTION

The invention has been made in view of the above described problems that the conventional art has had, and aims to realize a kneading degree adjusting device for a twin extruder in which the filling degree of the material can be stabilized and the opening and closing motions of the channels can be rapidly conducted.

In order to attain the above described object, there is provided, according to the invention, a kneading degree adjusting device for a twin extruder which comprises a cylinder and two screws rotatably provided in the cylinder, wherein at least a feeding part, a kneading part, a gate part and a discharging part are provided in order from an upstream side to a down stream side, characterized in that the device includes an opening degree variable channel forming part respectively provided in the screws at a position corresponding to the gate part, each of the opening degree variable channel forming parts having an outer diameter which is equal to or slightly larger than a diameter of the screw at the root of a flight thereof, an upper guide bore and a lower guide bore provided in the cylinder above and below the screws at a position corresponding to the gate part so as to extend in a radial direction, gate rods rotatably contained in the upper guide bore and the lower guide bore respectively, each of the gate rods being provided with opening degree changing recesses in a form of an opencut adjacent to each other in an axial direction of the gate rod so as to constitute opening degree variable channels in an annular shape in combination with outer peripheral faces of the opening degree variable channel forming parts, and that each of the opening degree changing recesses includes a first semicircular face having an inner diameter which is equal to or slightly larger than an inner wall face of the cylinder and a second semicircular face having such a shape that an upstream side end or a downstream side end of the first semicircular face is diagonally cut and outwardly slanted from the first semicircular face, the second semicircular face having an inner diameter which is equal to or slightly larger than the outer peripheral face of the opening degree variable channel forming part.

In addition, it is preferable that a boundary part between the first semicircular face and the second semicircular face may include a curved face.

BRIEF DESCRIPTION OF DRAWINGS

FIGS. 2A and 2B show a gate rod in the kneading degree adjusting device for the twin extruder in FIG. 1, wherein FIG. 2A is a front view and FIG. 2B is a sectional view taken along a line 2B—2B in FIG. 2A.

FIG. 3A and 3B show opening degree variable channels in a gate part of the kneading degree adjusting device for the twin extruder in FIG. 1 in a fully opened state, wherein FIG. 3A is a schematic enlarged view partly in section, FIG. 3B is a schematic sectional view taken along a line 3B—3B in FIG. 3A.

FIG. 4A and 4B show the opening degree variable channels in the gate part of the kneading degree adjusting device for the twin extruder in FIG. 1 in a fully closed state, wherein FIG. 4A is a schematic enlarged view partly in section, FIG. 4B is a schematic sectional view taken along a line 4B—4B in FIG. 4A.

FIG. 5A–5C show shapes of the opening degree variable channel in the kneading degree adjusting device for the twin extruder according to the invention as seen in an axial direction, wherein FIG. 5A is an explanatory view of the fully closed state, FIG. 5B is an explanatory view of a half opened state, and FIG. 5C is an explanatory view of the fully opened state.

FIG. 6A–6C show a conventional kneading degree adjusting device for the twin extruder, wherein FIG. 6A is a sectional view, FIG. 6B is an enlarged view of the essential portion partly in section, and FIG. 6C is a sectional view taken along a line 6C—6C.

DETAILED DESCRIPTION OF THE PREFERRED EMBODIMENTS

Figure 1:
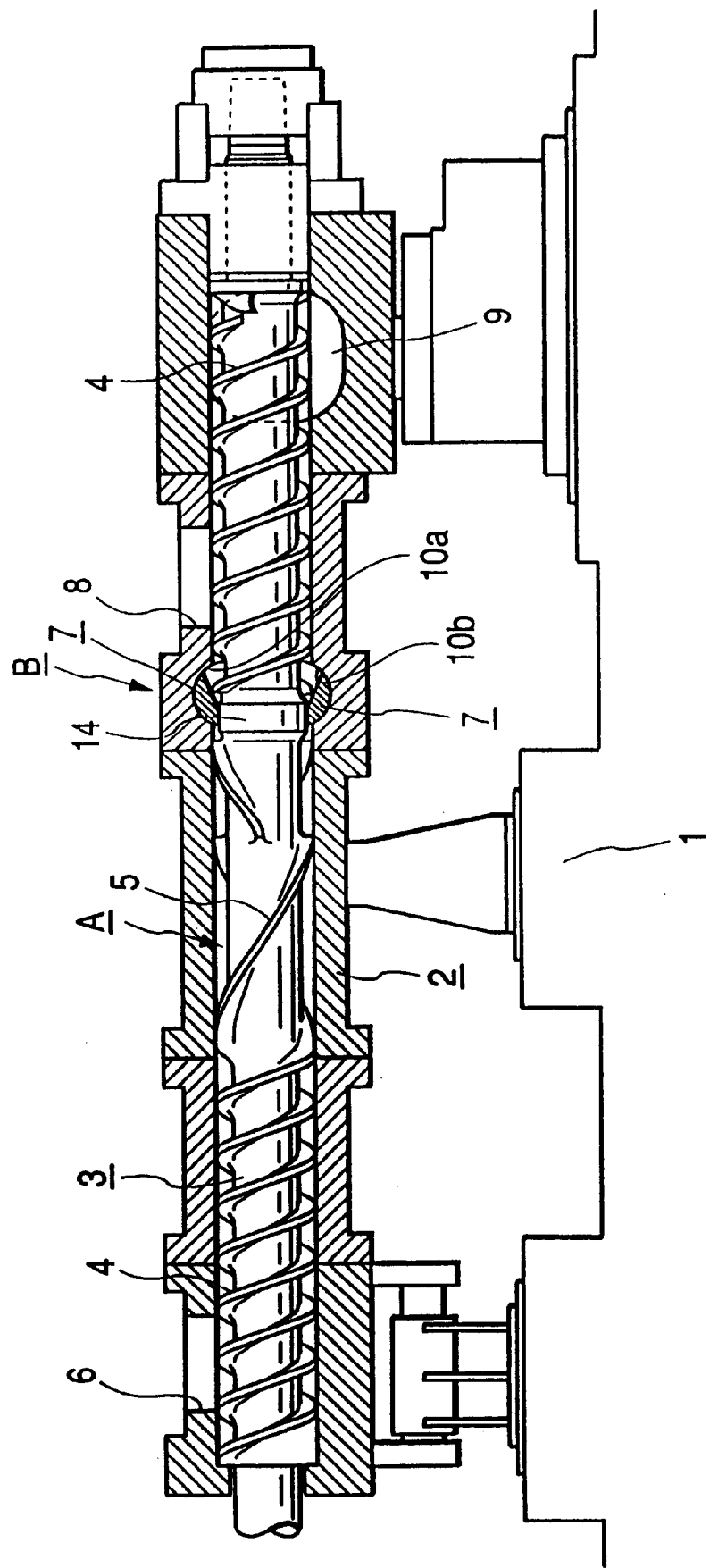
FIG. 1 is an explanatory view of a kneading degree adjusting device for a twin extruder according to one embodiment of the invention.
Figure 2A:
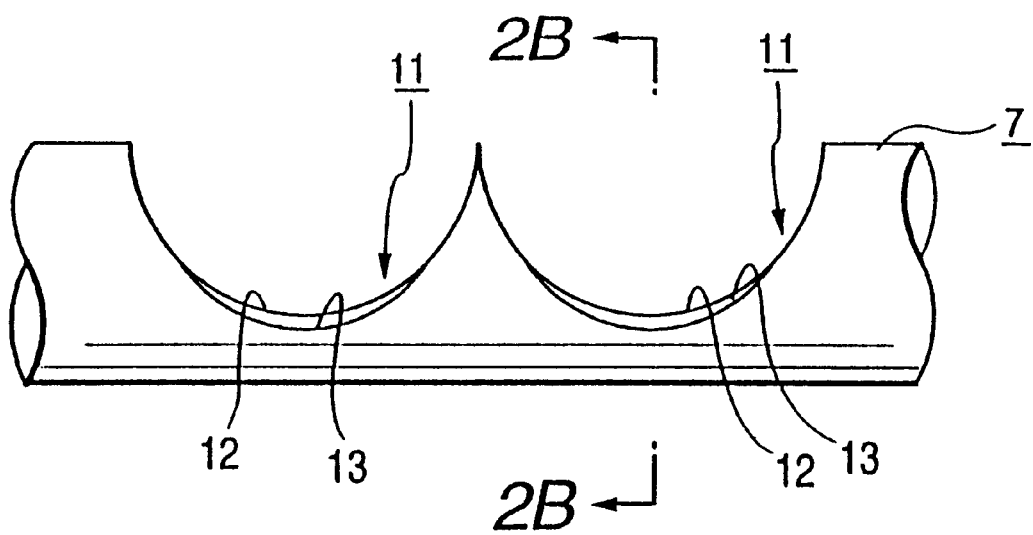
Figure 2B:
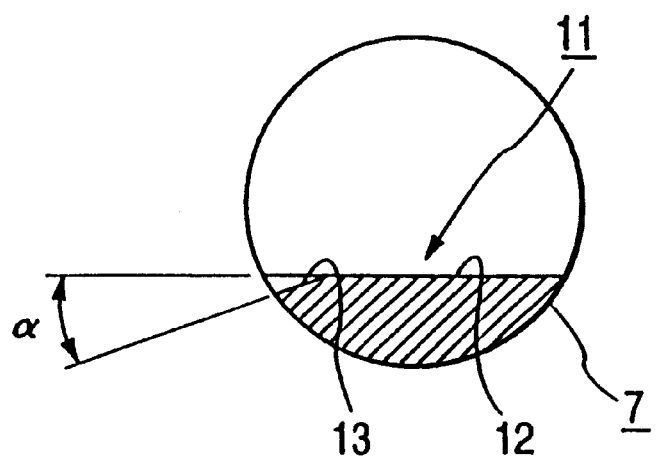

As shown in FIGS. 1 2A and 2B, the kneading degree adjusting device for the twin extruder according to one embodiment of the invention comprises a cylinder 2 supported on a base 1, two screws 3 rotatably provided in the cylinder 2, and a rotation actuating means (not shown) for rotating the two screws 3 in the same direction or in different directions, and consists of a feeding part, a kneading part A, a gate part B, a vent part having a vent port 8 and a discharging part in order from a supply port 6 formed at one end of the cylinder 2 toward a discharge port 9 formed at the other end.

Each of the screws 3 is provided with a rotor 5 at a position corresponding to the kneading part A, and at a position corresponding to the gate part B, an opening degree variable channel forming part 14 in a columnar shape having an outer diameter which is equal to or slightly larger than a diameter of the screw 3 at the root of a flight. The entire area of the screw 3, except for the kneading part A and the gate part B, is provided with flights 4.

The cylinder 2 is provided at a position corresponding to the gate part B with an upper guide bore 10a and a lower guide bore 10b respectively above and below the screws 3 so as to extend in a direction perpendicular to the axial direction of the cylinder and open largely in an inner wall of the cylinder. Into both the guide bores 10a, 10b are rotatably inserted gate rods 7 which will be described later.

It is preferable that at least one end of each of the gate rods 7 may be projected outwardly from an outer wall of the cylinder 2 and connected to a rotation actuating means (not shown) so as to perform positive and reverse rotations at determined rotation angles.

As shown in FIGS. 2A to 4B, each of the gate rods 7 is formed with opening degree changing recesses 11 in a form of an opencut adjacent to each other in its axial direction in order to constitute opening degree variable channels S in an annular shape in combination with outer peripheral faces of the opening degree variable channel forming parts 14 of the screws 3. Each of the opening degree changing recesses 11 consists of a first semicircular face 12 having an inner diameter which is equal to or slightly larger than an inner wall face 2a of the cylinder 2, and a second semicircular face 13 having such a shape that an upstream side end of the first semicircular face 13 is diagonally cut and outwardly slanted at a determined angle α from the first semicircular face 12. The second semicircular face 13 has an inner diameter which is equal to or slightly larger than an outer diameter of the opening degree variable channel forming part 14 of the screw 3.

In this embodiment, the second semicircular face 13 is formed in a shape that is tapered (cut) from the first semicircular face 12 at its upstream side end. However the second semicircular face 13 is not limited to such a shape but may be formed in a shape that is tapered (cut) from the first semicircular face 12 at its downstream side end. It is to be noted that in the case where the second semicircular face 13 is formed in the shape that is tapered (cut) from the first semicircular face 12 at its downstream side end, arrangement of the gate rods 7 in an axial direction of the cylinder must be set in such a manner that a boundary part between both of the faces may confront the opening degree variable channel forming part 14 of the screw 3.

Moreover, the boundary part between the first semicircular face 12 and the second semicircular face 13 is not limited to an angled shape as in this embodiment, but may be formed as a curved face.

Figure 3A:
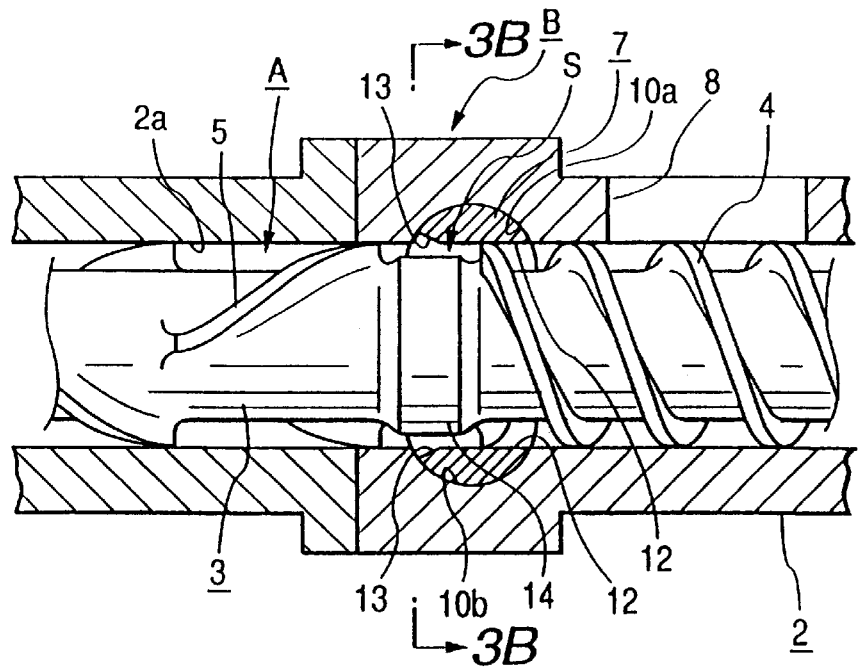
Figure 3B:
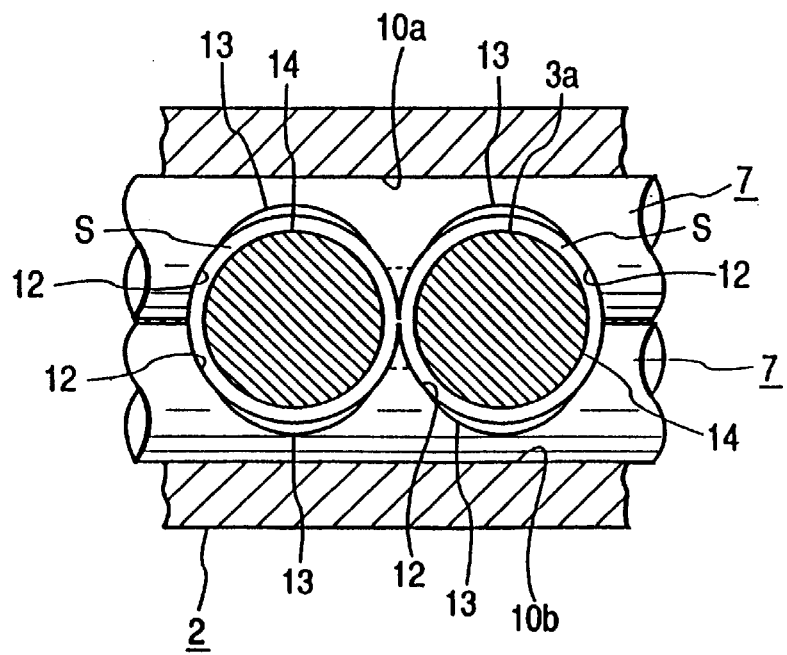

FIG. 3A and 3B shows the opening degree variable channels S in a fully opened state. In this fully opened state, the gate rods 7 inserted through the upper guide bore 10a and the lower guide bore 10b axially symmetrically are rotated respectively to the positions at which he first semi-circular face 12 and the outer peripheral face of the opening degree variable channel forming part 14 are substantially in parallel, and the opening degree of the variable channels S will become maximum. On this occasion, the shape of the opening degree variable channel S is a perfect ring as seen from the axial direction.

Figure 4A:
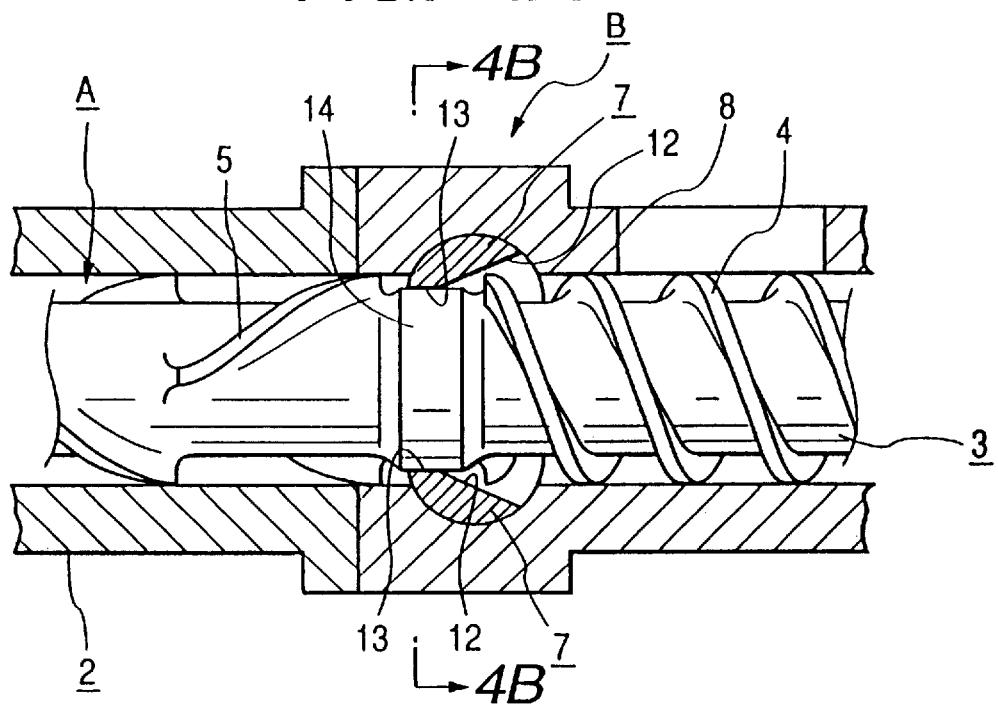
Figure 4B:
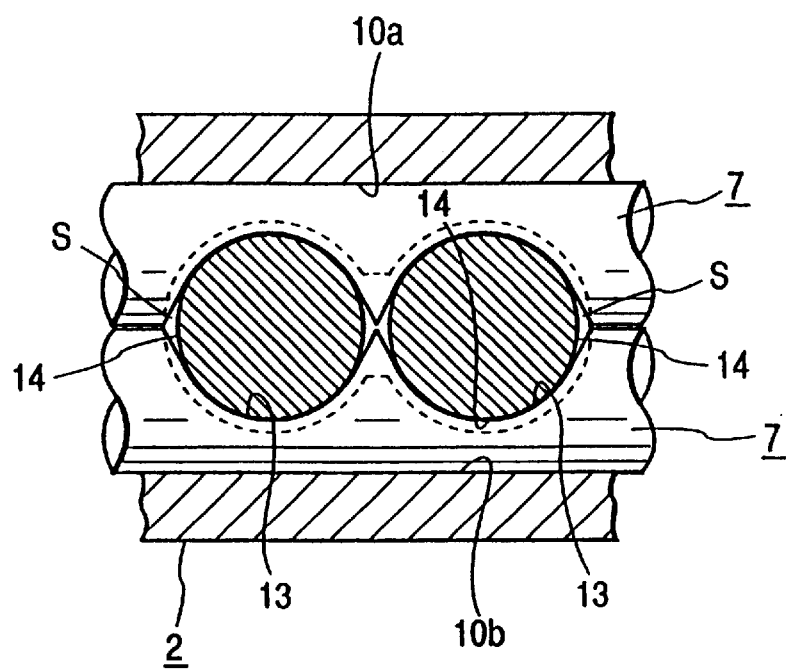

FIG. 4A and 4B show the opening degree variable channels S in a fully closed state. In this fully closed state, the gate rods 7 inserted through the upper guide bore 10a and the lower guide bore 10b axially symmetrically are rotated respectively to the positions at which the second semicircular face 13 is in abutment against the outer peripheral face of the opening degree variable channel forming part 14 in each of the screws 3, and the opening degree of the opening degree variable channels S will become minimum. On this occasion, the shape of the opening degree variable channel S as seen from the axial direction is such that slight gaps are formed by the first semicircular faces 12 at both sides of the axial core.

Figure 5A:
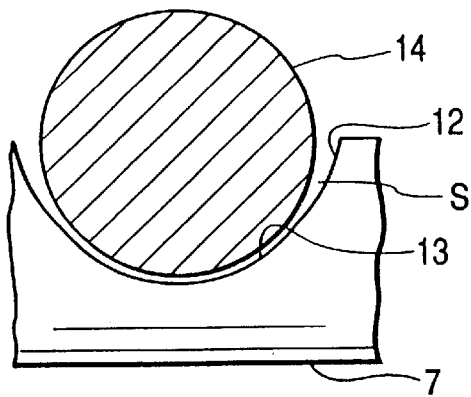
Figure 5B:
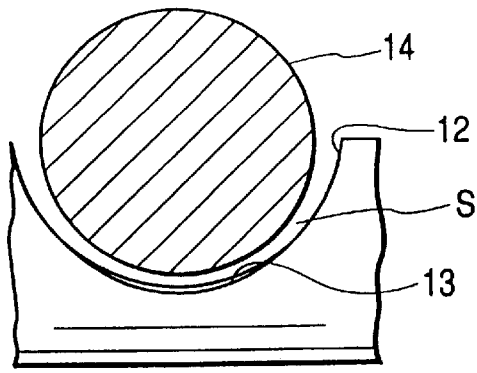
Figure 5C:
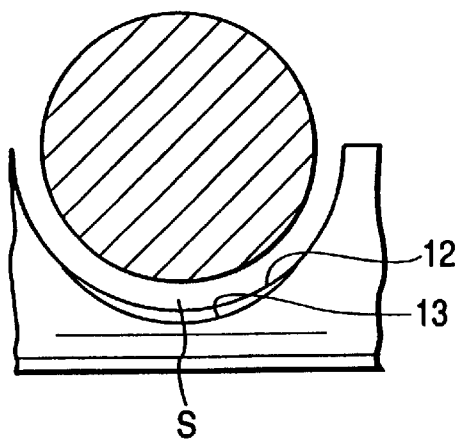
Figure 6A:
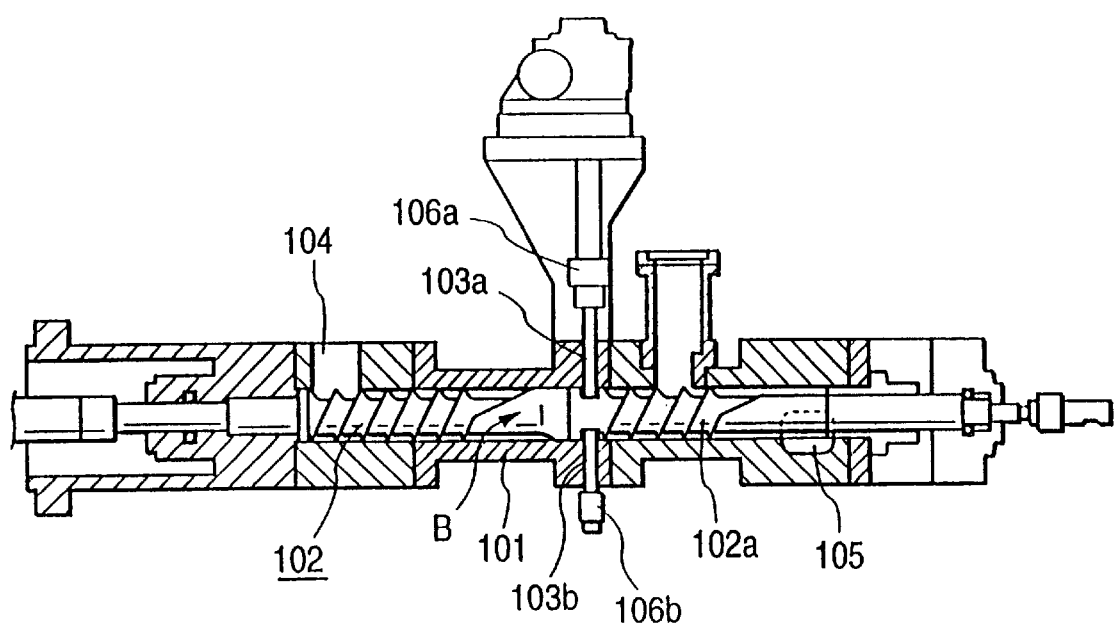
Figure 6B:
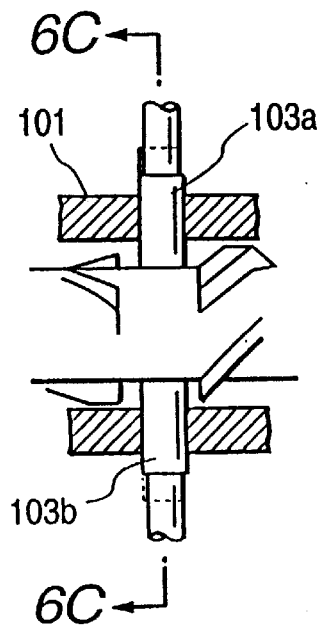
Figure 6C:
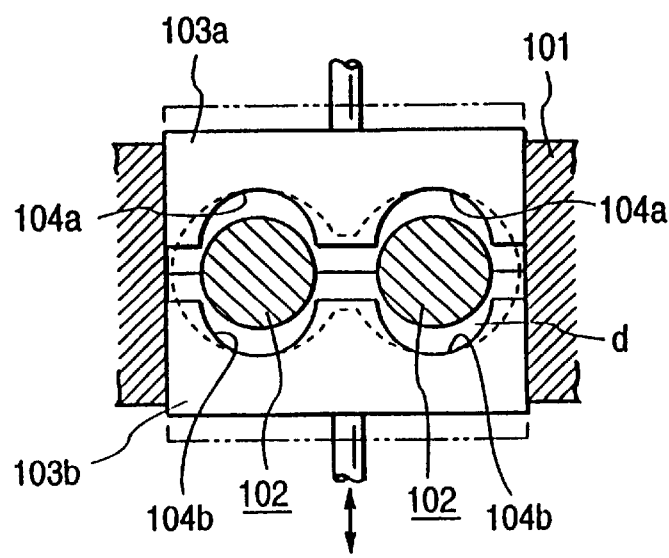

FIG. 5A–5C show the shape of the opening degree variable channel S in a fully closed, in a half closed, and in a fully opened state as seen in an axial direction. In the whole range from the fully closed state as shown in FIG. 5A through the half closed state as shown in FIG. 5B to the fully opened state as shown in FIG. 5C, the shape of the opening degree variable channel S is substantially annular as seen in the axial direction. As the result, even if the opening degree of the opening degree variable channel S has changed, the filling degree of the material in the kneading part A upstream of the gate part B will be stabilized, and a uniform kneading efficiency can be obtained.

The invention can be applied not only to the kneading machine comprising the two shafts having the same diameter as shown in the above described embodiment, but also to a kneading machine comprising two shafts having different diameters. It is needless to say that the invention is effective not only with a twin extruder of a non-meshed type, but is effective with those of a meshed type and a half-meshed type.

In the above described embodiment, there is provided the vent part including the vent port 8. However, in case where volatile components need not be removed from the material, there is no need of providing the vent part including the vent port.

Being constructed as above described, the invention can attain the following effects:

Because the shape of the opening degree variable channel as seen in the axial direction is substantially annular in the whole range from the fully opened state to the fully closed state, the filling degree of the material in the kneading part upstream of the gate part will be stabilized, and the uniform kneading efficiency can be obtained.

Further, because the opening degree variable channel can be varied from the fully opened position to the fully closed position by rotating the gate rods at a slight rotation angle, the opening degree can be rapidly changed.

In addition, because the gate rods, the guide bores to be provided in the cylinder, etc. can be easily made by machining, the manufacturing cost can be remarkably reduced.

What is claimed is:

1. A kneading degree adjusting device for a twin extruder, comprising:
 a cylinder, said cylinder including at least a feeding part, a kneading part, a gate part and a discharging part provided in order from an upstream side to a downstream side of said cylinder;

two screws rotatably provided in said cylinder;

opening degree variable channel forming parts respectively provided in said screws at a position corresponding to said gate part, each of said opening degree variable channel forming parts having an outer diameter which is equal to or slightly larger than a diameter of said screw at the root of a flight thereof, an upper guide bore and a lower guide bore provided in said cylinder above and below said screws at a position corresponding to said gate part so as to extend in a radial direction, gate rods rotatably contained in said upper guide bore and said lower guide bore respectively, each of said gate rods being provided with opening degree changing recesses in a form of an opencut adjacent to each other in an axial direction of a corresponding one of said gate rods so as to constitute opening degree variable channels in an annular shape in combination with outer peripheral faces of said opening degree variable channel forming parts, and that each of said opening degree changing recesses includes a first semicircular face having an inner diameter which is equal to or slightly larger than an inner wall face of said cylinder and a second semicircular face having such a shape that one of an upstream side end and a downstream side end of said first semicircular face is diagonally cut and outwardly slanted from said first semicircular face, said second semicircular face having an inner diameter which is equal to or slightly larger than said outer peripheral face of a corresponding one of said opening degree variable channel forming parts;

wherein the opening degree variable channels are varied by rotating said gate rods.

2. The kneading degree adjusting device for a twin extruder as claimed in claim 1, wherein a boundary part between said first semicircular face and said second semicircular face includes a curved face.

3. The kneading degree adjusting device for a twin extruder as claimed in claim 1, wherein when said second semicircular face is in abutment against the corresponding opening degree variable channel forming part, the corresponding opening degree variable channel is in a fully closed position.

* * * * *